United States Patent [19]

Cox et al.

[11] 4,143,982
[45] Mar. 13, 1979

[54] DISPENSING BRUSH

[76] Inventors: Robert H. Cox, 33 Ferncliff Rd., Scarsdale, 10583; Jack W. Kaufman, Merrick, both of N.Y. 11566

[21] Appl. No.: 787,861

[22] Filed: Apr. 15, 1977

[51] Int. Cl.² .................. A46B 11/04; A46B 11/02
[52] U.S. Cl. .............................. 401/280; 401/186; 401/281
[58] Field of Search ............... 401/28, 183, 186, 280, 401/281, 291; 132/11 R, 85, 88.7

[56] References Cited

U.S. PATENT DOCUMENTS

| 1,532,955 | 4/1925 | Sammons | 401/281 |
| 1,690,022 | 10/1928 | Langhaus | 401/280 X |
| 1,820,787 | 8/1931 | Evans et al. | 401/280 X |
| 2,736,914 | 3/1956 | Ratliff | 401/281 |
| 3,597,097 | 8/1971 | Kellis | 401/280 X |
| 3,597,098 | 8/1971 | Kellis | 401/281 X |

FOREIGN PATENT DOCUMENTS 58430  11/1953  France ........................ 401/281

Primary Examiner—Ronald E. Suter
Attorney, Agent, or Firm—Charles R. Fay

[57] ABSTRACT

A dispensing brush for discrete material e.g. powder comprising a bristle tray having an outstanding rim and a bottom having longitudinal interrupted slots therein; slidingly attached thereto within the tray there is a powder container having a bottom with cross slots therein; said cross slots being alignable with the slots in the tray member or misaligned therewith for applying powder, i.e. to the body e.g. of an animal while at the same time brushing the animal's fur.

3 Claims, 8 Drawing Figures

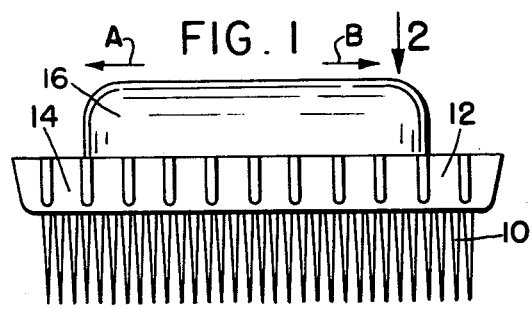
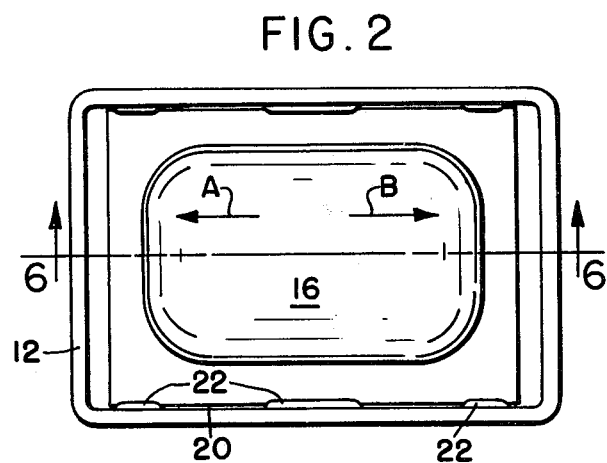
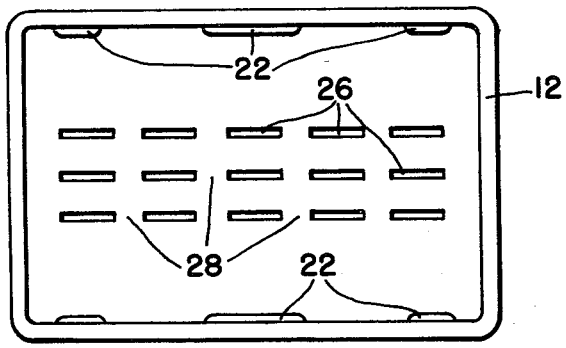
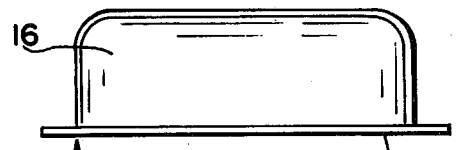
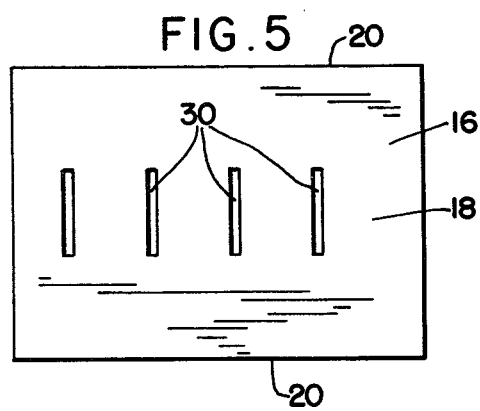
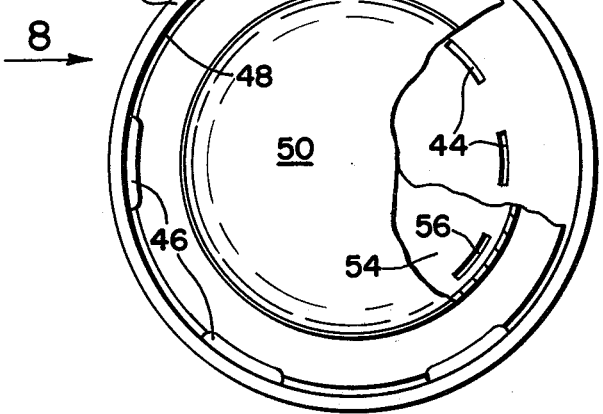
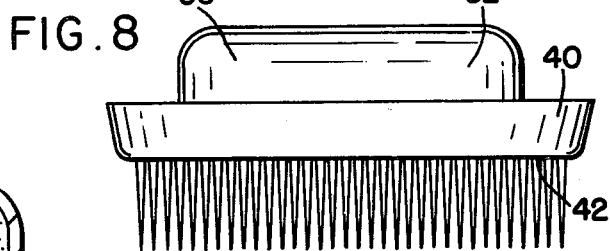
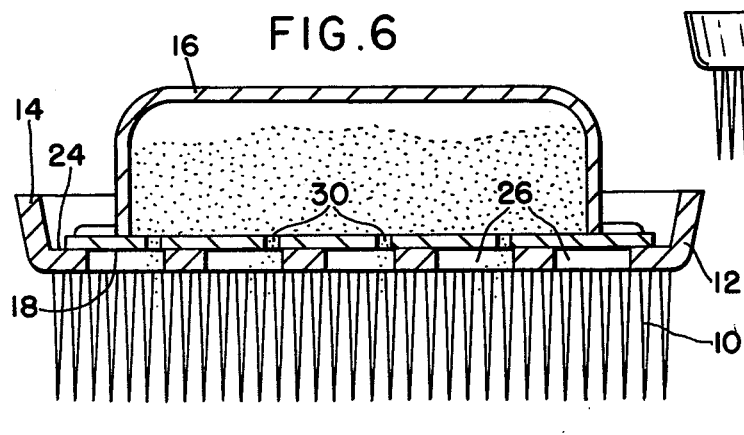

DISPENSING BRUSH

BACKGROUND OF THE INVENTION

While there have been powder applicators in the prior art these have been relatively clumsy, expensive, or in the form of combs. The present invention concerns the provision of a powder dispensing back for a brush which is more efficient for the purpose of brushing an animal while at the same time applying medications, e.g. antiseptics, flea and tick powders, etc. thereto.

SUMMARY OF THE INVENTION

A powder dispensing brush comprising a tray having an upstanding circumferential rim acting as a handle, there being bristles extending outwardly away from the bottom of the tray. The bottom of the tray is provided with a series of interrupted longitudinal apertures in rows and between each row therebeing a blank spot.

A powder container for the tray is provided, this comprising an inverted basin-like member having a continuous bottom acting as a permanent or removable and replaceable closure, the powder being held in the basin thereby and the bottom having a series of spaced apertures, e.g. cross slots therein at right angles with respect to the lengths of the slots in the bottom of the tray. Means is provided for slidably guiding and holding the bottom of the basin in its inverted relationship with respect to said tray; and simply by moving the powder container longitudinally the apertures or slots therein may become aligned with the apertures or slots in the tray bottom and selectively misaligned therewith for applying powder as may be desired and also for closing off the escape of powder i.e. through gravity when the brush is not in use.

The powder container may be of rigid injection molded plastic of any kind desired, or it may be distortable with a memory to return to its original position after being manually dispensed, so that powder may be dispensed by gravity from a rigid container, or if the distortable container is used powder may be forceably ejected through the combined slots to the pelt of the animal or other surface.

BRIEF DESCRIPTION OF THE FIGURES

FIG. 1 is a view in side elevation of the dispensing brush;

FIG. 2 is a plan view thereof looking in the direction of arrow 2 in FIG. 1;

FIG. 3 is a plan view of the tray with the powder container removed;

FIG. 4 is a view in side elevation of the powder container;

FIG. 5 is a bottom plan view of the powder container looking in the direction of arrow 5 in FIG. 4;

FIG. 6 is a sectional view on an enlarged scale taken along line 6—6 of FIG. 2;

FIG. 7 is a plan view of a modification, parts being broken away for clarity of illustration; and FIG. 8 is a view in side elevation looking in the direction of arrow 8 in FIG. 7.

PREFERRED EMBODIMENT OF THE INVENTION

The numeral 10 indicates plastic or other bristles depending from a tray 12 having a circumferential upstanding rim 14 which may act as a flange grip for the hand of the user.

A holder or container 16 of either rigid or distortable material is provided with a flat closure bottom 18 having outstanding parallel side edges 20 that are guided and confined by straight narrow ribs 22, one at each side of the respective interior aspects of the side parts of rib 14. The bottom 18 of the powder container 16 is shorter than the length of the tray and the container therefore may be reciprocated according to arrows A, B in FIGS. 1 and 2, relative to the tray.

The tray has a flat bottom 24 having spaced rows of interrupted longitudinal slots 26, so that the rows have blank areas 28 between them. The bottom 18 of the powder container has a series of spaced cross slots 30, FIG. 5, and with the powder container assembled to the tray, the slots 30 may be aligned with areas of slots 26 to allow powder to descend into and through the bristles, or the flow of powder may be shut off by moving the powder container to align slots 30 with areas 28 of the tray bottom 12.

As can be seen from the drawings, the slots 30 are aligned with some part of the slots 26 during most of the operation of the brush.

If the container 16 is rigid, the powder falls by gravity aided by reciprocation of the entire brush. If the container is distortable, it may be pressed down, ejecting powder by force. With a memory type plastic, the distortable container returns to original configuration, ready for another dispensing action.

FIGS. 7 and 8 disclose a rotatable form of the invention and in this case there is a circular tray having an upstanding rim 40 with a continuous bottom 42 which has bristles at the lower surface thereof in the manner of bristles 10 on tray 12. The bottom 42 has a series of circumferential slots 44 and spaced circumferentially arranged ribs 46 for rotatably containing the circular edge 48 of a circular powder container 50. This powder container may have an operating knob 52 at the center thereof if desired but it may also be rigid or distortable as above described as to the powder container 16. The powder container 50 has a bottom 54 with a series of circumferential arranged openings 56 therein and it will be seen that by rotating the knob 52 the holes 56 may be aligned or misaligned with respect to slots 44 for dispensing or stopping the flow of the powder.

The back of the brush may have a reclosable opening for refitting, or the dispenser may be refilled in any other convenient manner such as removable of the back and replacement thereof after filling.

We claim:

1. A brush dispenser comprising a tray including a bottom, spaced generally parallel openings in the bottom, said openings being longer than they are wide, bristles extending down from the bottom, and a rim extending up from the bottom, said rim surrounding the bottom at its edges, a container for discrete material to be dispensed to the bristles through the openings, means guidingly securing the container to the tray within the rim at the surface of the tray bottom opposite the bristles, a bottom for the container in sliding engagement with the tray bottom, and spaced generally parallel openings in the container bottom, said openings being longer than they are wide, the lengthwise dimensions of openings in the tray bottom and the container bottom intersecting at angles to each other and selectively aligned or misaligned upon sliding the container relative to the tray.

2. The brush dispenser of claim 1 wherein the container and tray are rectangular and the container slides rectilinearly relative to the tray.

3. The brush dispenser of claim 1 wherein the angles are substantially right angles.

* * * * *